Nov. 1, 1955  A. J. ROCKAFELLER  2,722,195
DEVICE FOR FRIGHTENING BIRDS AND ANIMALS
Filed April 29, 1954
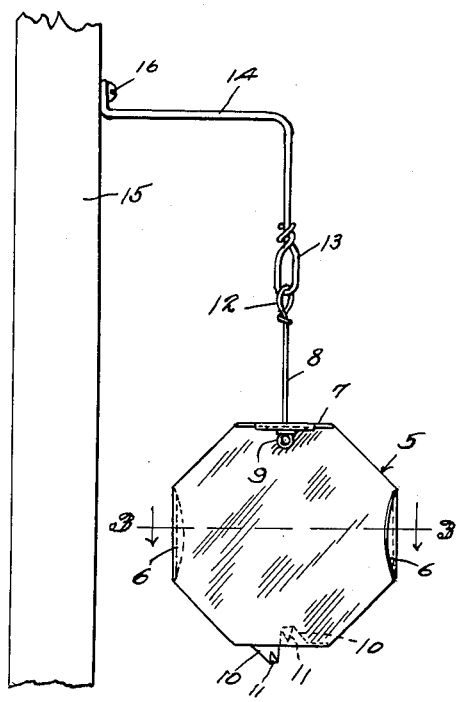
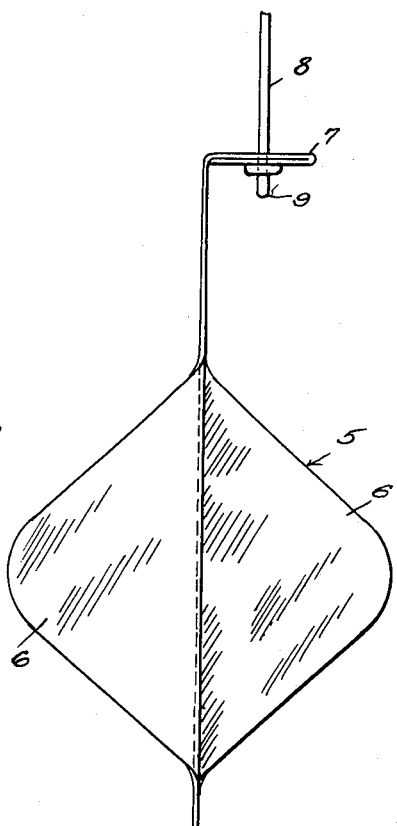
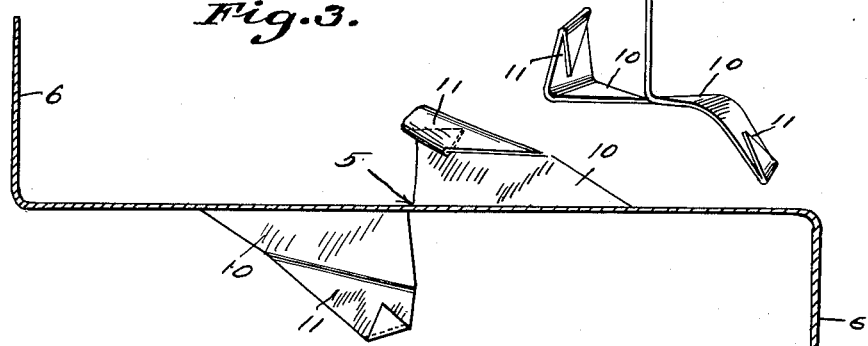
A. J. Rockafeller INVENTOR

United States Patent Office 2,722,195
Patented Nov. 1, 1955

2,722,195

DEVICE FOR FRIGHTENING BIRDS AND ANIMALS

Arthur J. Rockafeller, Danville, Pa.

Application April 29, 1954, Serial No. 426,436

4 Claims. (Cl. 116—22)

This invention relates to a device designed for frightening away birds and animals from locations where such birds and animals frequently destroy property.

An important object of the invention is to provide a device of this character which is especially designed for positioning on power or telephone poles for frightening away woodpeckers or similar birds which frequently damage the poles by forming large holes in the poles.

Another object of the invention is to provide a device of this character which may be readily installed on a post in such a way that its movements under wind pressure will tend to frighten birds away from the pole or place where the device is located.

Still another object of the invention is to provide a device in the form of thin sheet material designed to present wide flat surfaces to cause rotation and swinging of the device under wind pressure.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is an elevational view of a device constructed in accordance with the invention.

Fig. 2 is an enlarged edge elevational view.

Fig. 3 is a sectional view taken on line 3—3 of Fig. 1.

Referring to the drawing in detail, the device comprises a body portion indicated generally by the reference character 5, the body portion being constructed preferably of light sheet material with portions of its edges bent laterally at 6 providing flanges disposed in opposite directions at the sides of the body portion.

The upper edge of the body portion is bent laterally at 7 providing a flange which is formed with an opening to receive the lower end of the connecting rod 8, the rod 8 being provided with an eye 9 where it passes through the flange 7, forming a swivel connection between the rod 8 and body portion 5, so that it will rotate under wind pressure.

Formed integral with the body portion at the lower edge thereof, are blades 10 which extend in opposite directions, and are arranged adjacent to the vertical axis of the body portion, the ends of the blades 10 being turned upwardly providing wind engaging end portions 11 to cause the body portion 5 to move vertically over the rod 8 as it rotates.

The upper end of the connecting rod 8 is formed into a loop 12 that engages with the loop 13 formed on the lower end of the bracket 14, which in turn is secured to a supporting surface 15, by means of the screw 16.

From the foregoing it will be seen that due to the construction shown and described, I have provided a device which when secured to a power or telephone pole, will frighten away birds or animals, which damage poles and render the poles ineffective for accomplishing the purpose for which they have been designed.

Having thus described the invention, what is claimed is:

1. A device for frightening away birds, comprising a bracket adapted to be attached to a supporting surface, a wide flat rectangular body constructed of sheet material, laterally extended blades formed on the edges of said body at the corners thereof against which wind strikes in rotating the body, and a swivel connection between the body and bracket.

2. A device for frightening away birds, comprising a bracket adapted to be secured to a supporting surface, a substantially rectangular body having corners constructed of sheet material, blades extending from the edges of the body at the corners thereof and disposed in opposite directions against which wind pressure is directed, rotating said body, and a swivel connection between said bracket and body.

3. A device for frightening away birds, comprising a bracket having a depending supporting end, a substantially rectangular body having corners, said corners extending laterally providing blades, one of said blades having an opening, a connecting rod having one end thereof swiveled in said opening, and means for connecting the rod to the bracket.

4. A device for frightening away birds comprising a bracket, a rectangular flat body constructed of sheet material hung on said bracket with the side faces of the body disposed vertically, laterally extended blades formed on said body at the corners thereof and disposed forwardly and rearwardly in opposite directions, and blades extending forwardly and rearwardly at the lower edge of said body.

References Cited in the file of this patent

UNITED STATES PATENTS

| | | |
|---|---|---|
| 697,072 | Davis | Apr. 8, 1902 |
| 1,167,502 | Huffman et al. | Jan. 11, 1916 |